US005435083A

United States Patent [19]

Thompson

[11] Patent Number: 5,435,083

[45] Date of Patent: Jul. 25, 1995

[54] AQUATIC WEED ERADICATOR

[76] Inventor: John L. Thompson, Carbon River Ranch, 35415 Fairfax Forest Reserve Rd., E. Carbonado, Wash. 98323-9801

[21] Appl. No.: 243,569

[22] Filed: May 16, 1994

[51] Int. Cl.[6] .............................................. A01D 44/00

[52] U.S. Cl. .......................................... 37/341; 37/344; 56/8

[58] Field of Search ................. 37/314, 341, 344, 345, 37/346, 405, 403, 447, 457, 903, 904, 905; 56/8, 12.6, 328.1, 330; 299/9; 172/40

[56] References Cited

U.S. PATENT DOCUMENTS

| | | | |
|---|---|---|---|
| 3,540,194 | 11/1970 | Chaplin | 37/344 X |
| 3,624,933 | 12/1971 | Faldi | 37/341 X |
| 3,751,887 | 8/1973 | den Herder et al. | 56/8 |
| 3,982,593 | 9/1976 | Grobey | 172/40 |
| 4,205,507 | 6/1980 | McClure | 56/8 |
| 4,275,545 | 6/1981 | Pace | 56/8 |
| 4,616,588 | 10/1986 | Caddick | 37/341 X |
| 4,696,149 | 9/1989 | Hawk | 37/341 X |
| 4,892,359 | 1/1990 | Ottestad | 37/904 X |
| 5,142,849 | 9/1992 | Amimoto et al. | 56/8 |
| 5,152,126 | 10/1992 | Cousineau | 56/8 |

OTHER PUBLICATIONS

Steve Foss, *Spartina Threat to Washington's Saltwater Habitat,* Nov. 19 92, pp. 1–8.

Bobcat Brochure "Bobcat Compact Hydraulic Excavators, 200 Series Excavators".

Vibco,Inc., Catalog No. 9001C, pp. 27, 28 and 4 additional pages.

*Primary Examiner*—Randolph A. Reese
*Assistant Examiner*—Robert Pezzuto
*Attorney, Agent, or Firm*—Christensen, O'Connor, Johnson & Kindness

[57] ABSTRACT

An apparatus and method for removing unwanted vegetation (46). A fork (12) is provided having a vibratory motor (38) attached thereto. The fork is inserted into the rooting medium (48) surrounding the root mass (50) of the vegetation. While the fork is inserted therein, the fork is vibrated near the thixotropic level of the rooting medium, causing the rooting medium to liquefy. When the rooting medium is liquefied, the fork is raised upwardly, lifting the vegetation and corresponding root mass free of the rooting medium.

19 Claims, 3 Drawing Sheets

AQUATIC WEED ERADICATOR

FIELD OF THE INVENTION

The present invention relates to removal and eradication of unwanted vegetation, and more particularly, to eradication of unwanted aquatic vegetation growing along shorelines and in clones or clumps in shallow open water.

BACKGROUND OF THE INVENTION

Infestation by unwanted, nonindigenous vegetation is a common problem. Infestations can become so severe that native ecosystems are destroyed. For example spartina, commonly known as cord grass, is threatening to disrupt and/or destroy saltwater ecosystems in the Pacific Northwest. Another example similar to spartina, is purple loosestrife which infests freshwater lakes, rivers and wetlands.

Typically, spartina infests a tide flat by forming one or more colonies of dense vegetation. The dense vegetation traps fine sediment creating an elevated high marsh. Invading colonies of spartina grow together, further expanding the marsh. These marshes block water access and displace native shellfish, salt marsh plants, migratory birds, fish and other wildlife. In addition, the marshes can build to a level sufficient to block outflow of tidal water. Such blockage can result in increased flooding in shoreline areas, especially during periods of above-normal tides or heavy rains.

Eradication of invading spartina colonies has been difficult because the vegetation can grow from either seeds or root pieces, the root pieces also being known as rhizomes. When attempts are made to pull or dig up clumps of spartina, significant parts of the root mass usually break off, leaving rhizomes for future regeneration. Present eradication methods involve cutting the spartina with high speed rotary cutters, a process that disperses the cut weed and actually enhances the spread of the spartina, hand pulling and chemical application, all of which are quite ineffectual or undesirable.

Accordingly, the present invention provides an improved solution to the removal and eradication of unwanted vegetation in general, and more particularly to the eradication of unwanted vegetation along shorelines, such as spartina and purple loosestrife.

SUMMARY OF THE INVENTION

The invention provides a method for removing unwanted vegetation and in situ sifting of silt. In accordance with the present invention, the first step is to insert a root engaging member into the rooting medium surrounding the root mass of the unwanted vegetation. The root engaging member is then vibrated at a frequency predetermined to liquefy the rooting medium surrounding the root mass. When the rooting medium is liquefied, the root engaging member is removed to pull the vegetation and its corresponding root mass free of the rooting medium. Preferably, the step of vibrating the root engaging member includes operating a vibratory motor mounted on the root engaging member that causes the root engaging member to vibrate.

In other aspects of the invention, an apparatus for removing unwanted vegetation is provided. The apparatus includes a fork for insertion into the rooting medium surrounding the root mass of the vegetation. A vibratory motor is coupled to the fork, which vibrates the fork at a frequency predetermined to liquefy the rooting medium surrounding the root mass. The fork is mounted to the bucket of an excavator. Thus, the excavator is operated to insert the fork into the rooting medium, and to lift the vegetation free of the rooting medium when the rooting medium surrounding the root mass is liquefied.

Where the unwanted vegetation is vegetation growing along a shoreline, such as in tide flats, the excavator is preferably supported on a buoyant platform for positioning the apparatus near the vegetation to minimize damage to the shoreline. For typical silty rooting medium conditions occurring in tide flats in the Pacific Northwest, the fork is preferably vibrated at a frequency in the range of 0.5 cycles per second to 9.0 cycles per second, with the optimal value expected to be around 7.0 cycles per second.

The present invention also provides an apparatus having a root removal member defining a plurality of projections. The projections are for insertion into the rooting medium proximate the root mass of unwanted vegetation. A mechanism vibrates the projections of the root removal member at a frequency predetermined to liquefy the rooting medium proximate the projections. Another mechanism removes the projections of the root removal member from the rooting medium, and the root mass is removed along with the projections from the rooting medium.

In yet other aspects of the invention, an apparatus having a root removal member is provided, wherein the root removal member defines a plurality of elongate projections. The projections are capable of insertion into the rooting medium proximate the root mass of unwanted vegetation. Further, the projections are spaced sufficiently to engage with and retain the rooting medium. A motor is coupled to the root removal member, which is operable to vibrate the elongate projections. The motor vibrates the elongate projections at a frequency predetermined to liquefy the rooting medium surrounding the elongate projections, such that the root mass is readily removed from the rooting medium and retained by the elongate projections.

Additionally, an assembly is provided by the present invention for adapting a boom for the removal of unwanted vegetation. The vegetation includes a root mass surrounded by a rooting medium, wherein the boom is selectively positionable relative to the root mass. The assembly includes a root engaging member having an engaging portion capable of insertion into the rooting medium to engage the root mass. A vibration dampener secures the engaging member to an end of the boom, wherein the vibration dampener permits the engaging member to vibrate while substantially isolating the boom from vibration of the engaging member. A vibratory energy source coupled to the engaging member causes the engaging portion to vibrate, which causes the rooting medium around the engaging portion to liquefy. Thus, repositioning of the boom away from the root engaging member results in removal of the root mass from the rooting medium with the root engaging member.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
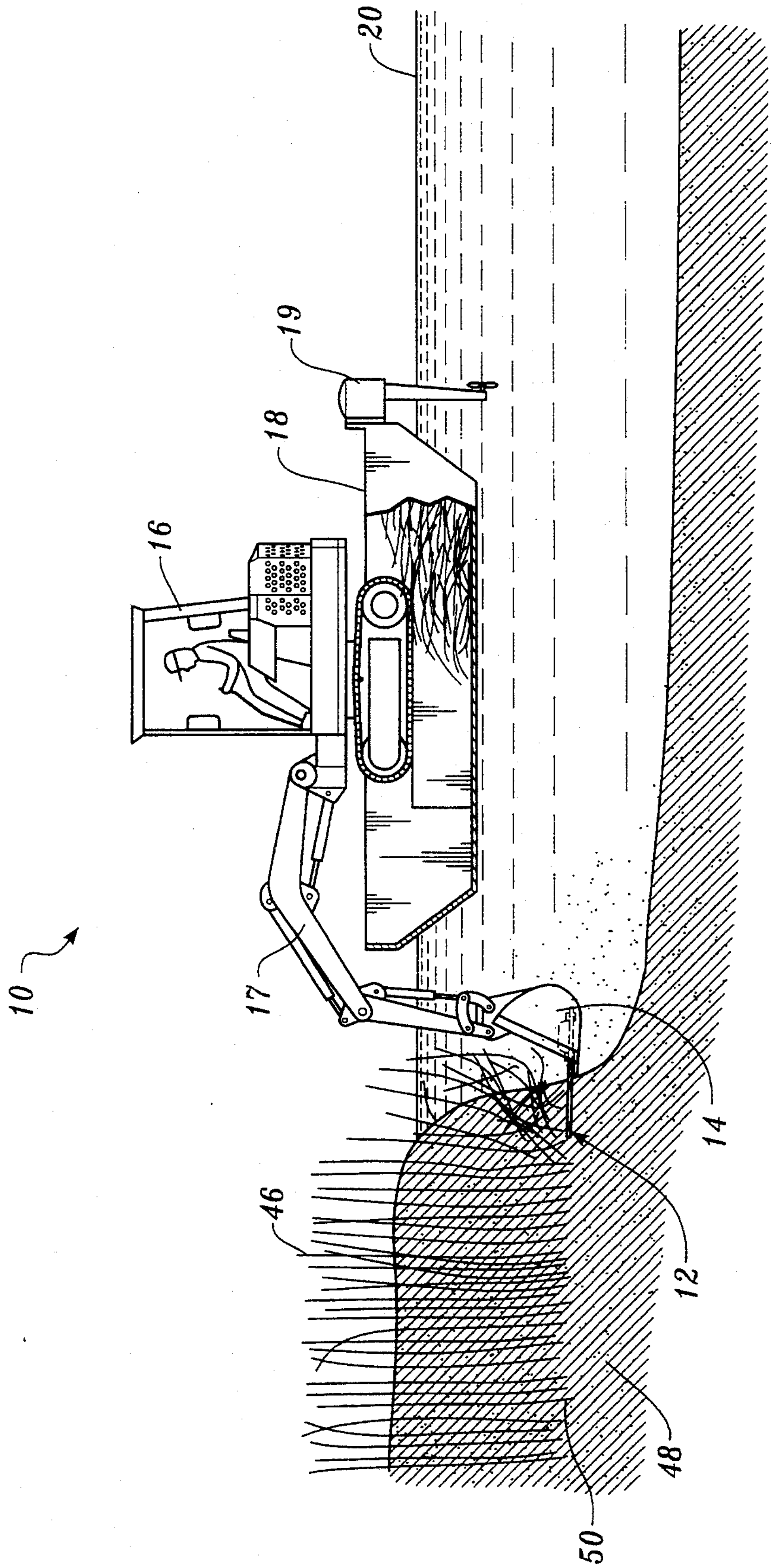
FIG. 1 is an end elevation view of a weed eradication system in accordance with the present invention mounted in a buoyant barge, with the endwall of the barge shown cut away for clarity.

A preferred embodiment of a system in accordance with the present invention, indicated generally by reference numeral 10, is illustrated schematically in FIG. 1. The system 10 includes a fork 12, preferably mounted to a bucket 14 of an excavator 16. The bucket 14 is carried on the distal end of the excavator boom 17. Excavator 16 may be of any standard type, such as the models 220, 225 and 231 of excavators sold under the trade name BOBCAT by Melroe Company of Fargo, N. Dak. The excavator 16 is mounted inside a buoyant barge 18, which floats the entire excavator 16 and items attached thereto on a water surface 20.

The barge 18 is of any conventional type capable of safely floating excavator 16 and the attached items, which include a propulsion system and as described below in more detail, a high pressure pump and sump arrangement when necessary. Preferably, the propulsion system for the barge 18 includes a pair of motors 19 mounted at opposite ends of the barge 18 for ease in maneuvering the barge 18. As an end view of barge 18 is shown in FIG. 1, only one motor 19 is visible, the second motor being behind the first motor in the illustrated view.

Figure 2:
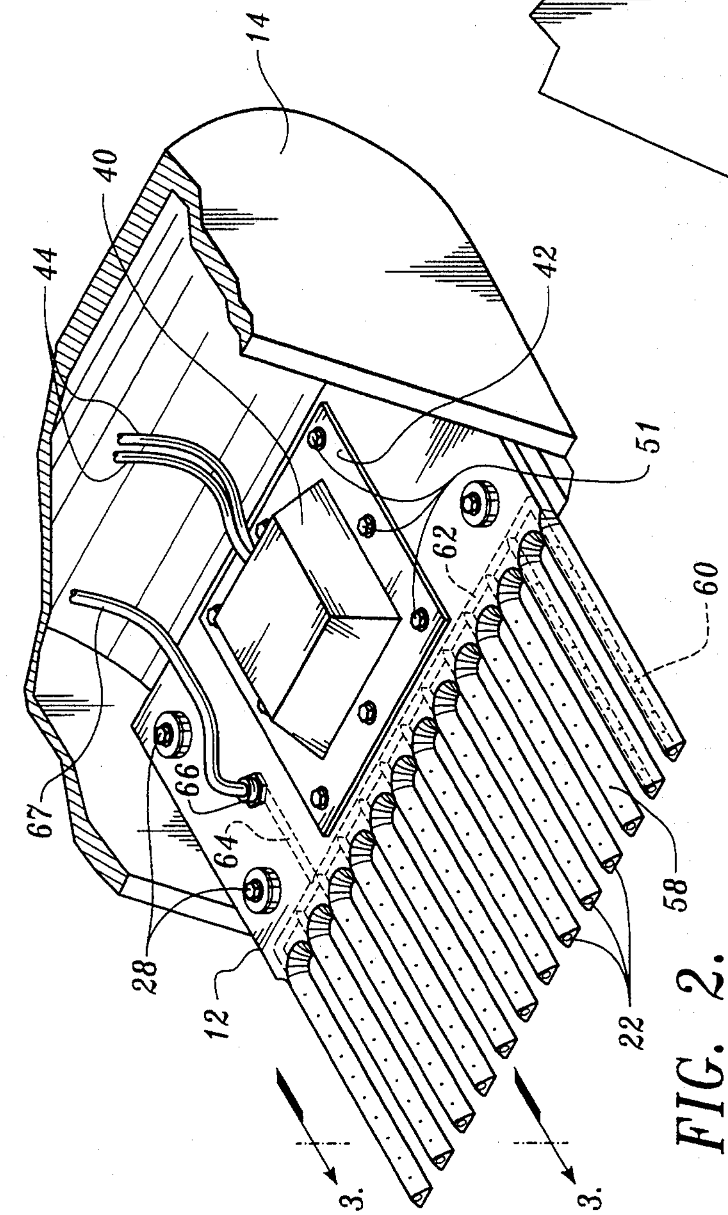
FIG. 2 is an enlarged isometric view of the fork and bucket of the system of FIG. 1, with the sidewalls of the bucket shown cut away for clarity.

Ideally, fork 12 comprises a steel alloy of a type having good corrosion resistance to water, and ideally good corrosion resistance to sea water. For example, stainless steel or steel coated with a corrosion-resistant paint may be utilized. Referring to FIG. 2, the fork 12 is generally rectangular-shaped, having a row of tines 22 formed in one end. The elongate tines 22 are oriented in parallel, spaced disposition and are sized to retain vegetation between the tines 22. Preferably, each tine 22 has a depth of about two feet, which is approximately one-half the overall depth of the fork 12. The row of tines 22 extends for approximately three feet, which is therefore approximately the width of the fork 12. The nominal spacing between each tine 22 is preferably about one inch. These dimensions for the fork 12 are believed to be suitable for use in removal of spartina. However, it should be readily apparent based on the disclosure contained herein that alternate dimensions and spacing of the tines may be utilized for spartina, other vegetation species, and other purposes.

Figure 3:
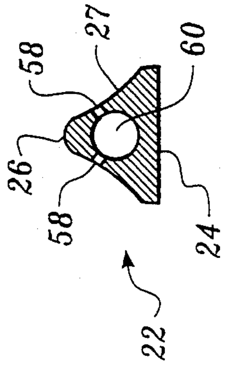
FIG. 3 is a cross-sectional view of a tine of the fork of FIGS. 1 and 2, along section line 3—3 of FIG. 2.

FIG. 3 shows a cross section of one of the tines 22 along section line 3—3 of FIG. 2. As shown in FIG. 3, each tine 22 includes a generally flat base 24, and two sides 27 that slope concavely upward from opposite sides of the base to a rounded top 26. Preferably, the base 24 has a length of about one and one-half inches, with the maximum height from the base 24 to the rounded top 26 being approximately one inch. These dimensions are again provided by way of nonlimiting example only.

As shown in FIG. 1, fork 12 is inserted into a rooting medium 48, such as silt or other soil, surrounding the root mass 50 of unwanted vegetation 46. When the fork 12 is inserted into the rooting medium 48, the fork 12 is vibrated horizontally near the thixotropic level of the rooting medium 48. The horizontally vibrating fork 12 creates waves in the silt, soil, water or a mix thereof, which propagate through the rooting medium 48, causing the rooting medium 48 to liquefy. The concave sides 27 of the tines 22 tend to act as a "scoop" on the rooting medium 48 and/or water to aid in the creation of the waves.

Figure 4:
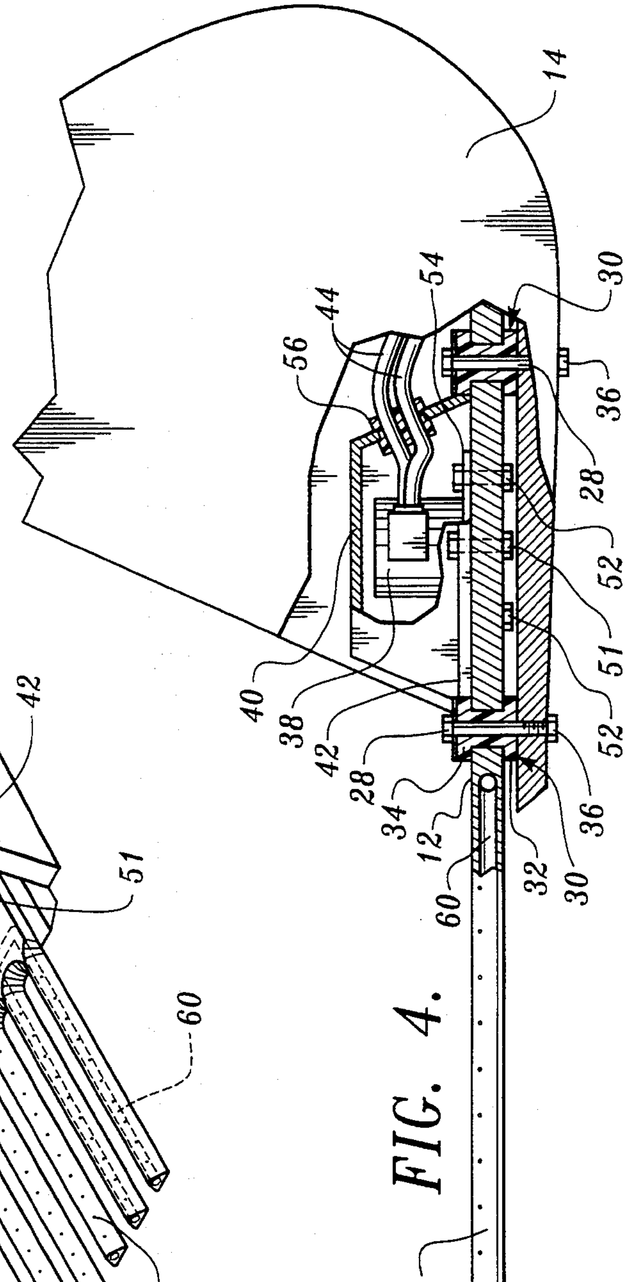
FIG. 4 is a side elevation view of the fork and bucket of FIGS. 1 and 2, with part of the bucket, fork, and housing cut away to illustrate internal features.

For specific rooting mediums or soil types, the efficacy of the vibrating fork 12 may be enhanced by having the tines 22 hollow and perforated on the concave sides 27 through which high pressure jets of water may be forced. For this reason a passage 60 is formed along the longitudinal axis of each tine 22 as shown in FIGS. 2 through 4. A passage 60 extends the length of each tine 22, opening to the environment at the distal end of each tine 22. The passages 60 extend to the base of each tine 22, where the passages connect to a passage 62 (indicated by hidden lines in FIG. 2) formed in the interior of the body portion of fork 12. Passage 62 runs generally perpendicular to passages 60, and connects with a supply passage 64 (also indicated by hidden lines in FIG. 1) formed in the interior of fork 12.

Supply passage 64 connects to port 66. Port 66 receives a supply of high pressure water through line 67 that extends to the barge 18. A conventional pump and sump arrangement (not shown) mounted on the barge, supplies high pressure water through line 66 to supply passage 64. Preferably, the supply of water is from the same water which supports the barge 18. The high pressure water received by supply passage 64 is then distributed through transverse passages 64 to each passage 60 extending through the tines 22. Finally, a plurality of perforations 58 formed along the length of each concave side 27 in the tines 22, penetrate through to passage 60. Thus, when high pressure water is pumped to the fork 12, high pressure jets of water are ejected through the distal end of each tine 22, and through perforations 58 formed in concave sides 27. It should be apparent that another fluid, such as compressed air, could be utilized rather than water, for supply to the passages 60.

Returning to FIG. 2, fork 12 is mounted to the upper inside surface of bucket 14, so that substantially the entire length of each tine 22 projects beyond the forward edge of the bucket 14. Fork 12 is preferably mounted to bucket 14 with a plurality of bolts 28 that penetrate through the fork 12 and bucket 14. A vibrational dampener 30, preferably made of an elastomeric material, surrounds each bolt 28 and inhibits the transmission of vibrations from fork 12 to bucket 14, and vice-versa, as shown in the cross section of the fork and bucket in FIG. 4.

Each vibrational dampener 30 is in the shape of a spool, having a lower lip 32 and an upper lip 34. Lower lip 32 of vibrational dampener 30 is positioned between the bottom surface of fork 12 and the upper surface of bucket 14, such that a spacing is maintained between the fork and the bucket. A bolt 28 penetrates through each vibrational dampener 30, so that the upper lip 34 of each vibrational dampener is positioned between the head of each bolt and fork 12.

A nut 36 is threaded onto the end of each bolt 28 that penetrates through the bucket 14, and is tightened down against the bucket. In this way, fork 12 is held snugly between the lower and upper lips 32 and 34 of vibrational dampeners 30, isolating the fork 12 from direct contact with bucket 14. In this manner, the boom 17 of the excavator 16 need not be constructed to withstand the vibration of the fork 12.

Mounted to the upper surface of the fork 12 at a location between the four bolts 28 is a vibratory motor 38. Vibratory motor 38 is preferably hydraulically powered and capable of operating for substantial periods of time under wet, muddy conditions, and ideally while immersed in sea water. Models B-190, B-250, B-320, HLF-700, and HLF-1300 of vibratory motors manufactured under the trade name VIBCO by Vibco, Inc. of Wyoming, R.I., are examples of such motors found suitable for the practice of the present invention. Other types of vibratory motors may be used as well, including types that are pneumatically or electrically powered. Vibratory motor 38 is mounted to fork 12 with bolts 52 that penetrate through the base plate 54 of the motor and through the fork 12.

Vibratory motor 38 is shielded by a housing 40. Hydraulic lines 44 pass from the excavator 16 through an aperture formed in housing 40 to vibratory motor 38 for providing power thereto. The hydraulic lines 44 are vibrationally isolated from the housing 40 by a vibrational dampener 56 that is mounted in the aperture formed in the housing. More particularly, the hydraulic lines 44 penetrate through vibrational dampener 56, and thus are vibrationally isolated from the housing 40. The hydraulic lines 44 are supplied hydraulic fluid from the system pump (not shown) of the excavator 16 to power vibration of the fork 12.

Housing 40 is fastened against the upper surface of the fork 12 by a plurality of bolts 51 as shown in FIG. 2. Each bolt 51 penetrates through a lip 42 formed around the lower edge of the housing 40, and through fork 12, such that the lip of the housing is held snugly between the head of each bolt 51 and the upper surface of fork 12. As shown in FIG. 4, the bolts 51 penetrate through to the lower surface of the fork 12, but do not contact the bucket 14. Specifically, there is sufficient space maintained between the bucket 14 and fork 12 by the vibrational dampeners 30, such that the bolts 51 do not contact the bucket 14. Thus, the housing 40 is vibrationally isolated from the bucket 14. Preferably, housing 40 is made of a steel alloy, of a type having good corrosion resistance to water, and ideally good corrosion resistance to sea water.

In operation, the barge 18 is positioned near the location of unwanted vegetation 46. The use of a barge or other watercraft minimizes potential damage to the ecosystem when removing vegetation near shorelines, but other platforms may be used to position the excavator 16 near unwanted vegetation. Once the barge 18 is appropriately positioned, the excavator 16 is operated to insert the tines 22 of fork 12 into or below the rooting medium 48 surrounding the root mass 50 of the vegetation 46.

While the tines 22 of the fork 12 are inserted into the rooting medium 48, the vibratory motor 38 vibrates the fork at approximately the thixotropic level of the rooting medium 48, causing the rooting medium to liquefy in the vicinity of fork 12. This same phenomenon occasionally occurs during earthquakes, causing soil affected by an earthquake to liquefy in some areas. Thus, the present invention also applies to the removal of unwanted vegetation occurring in areas other than around shorelines. The present invention is believed to be most ideally suited for moisture saturated soils.

For typical conditions occurring in tide flats, preferably fork 12 is vibrated in the range of 0.5 to 9.0 cycles per second, with the optimal value expected to be around 7.0 cycles per second, to cause liquefaction of the rooting medium 48. When the rooting medium 48 liquefies, the fork 12 is raised upwardly, such that the tines 22 of the fork lift the root mass 50 free of the rooting medium with the least resistance. In this way, the vegetation 46 can be removed without significant breakage of the root mass 50, minimizing the amount of rhizomes left in the rooting medium 48 for future regeneration. The removed vegetation 46 can be placed in the barge 18 for later disposal. Removal of the vegetation 46 causes dispersion of the rooting medium in the water, and in tidal situations facilitates removal of excess built-up silt with the outgoing tide, to restore normal shorelines.

Figure 5:
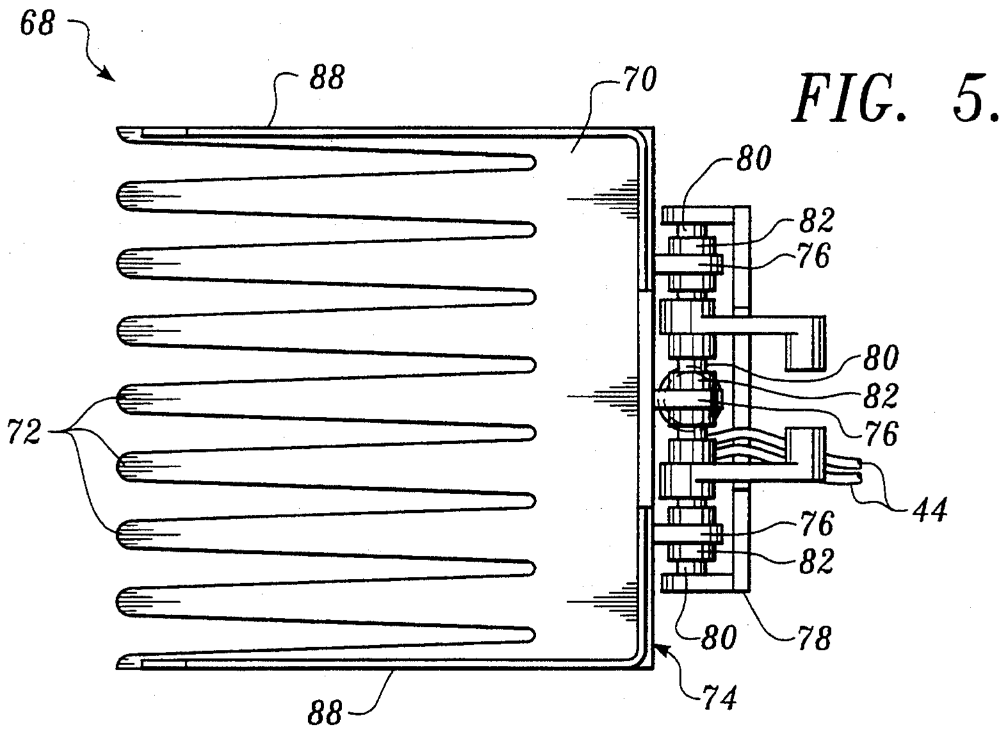
FIG. 5 is a top view of an alternate fork for use with a weed eradication system in accordance with the present invention.
Figure 6:
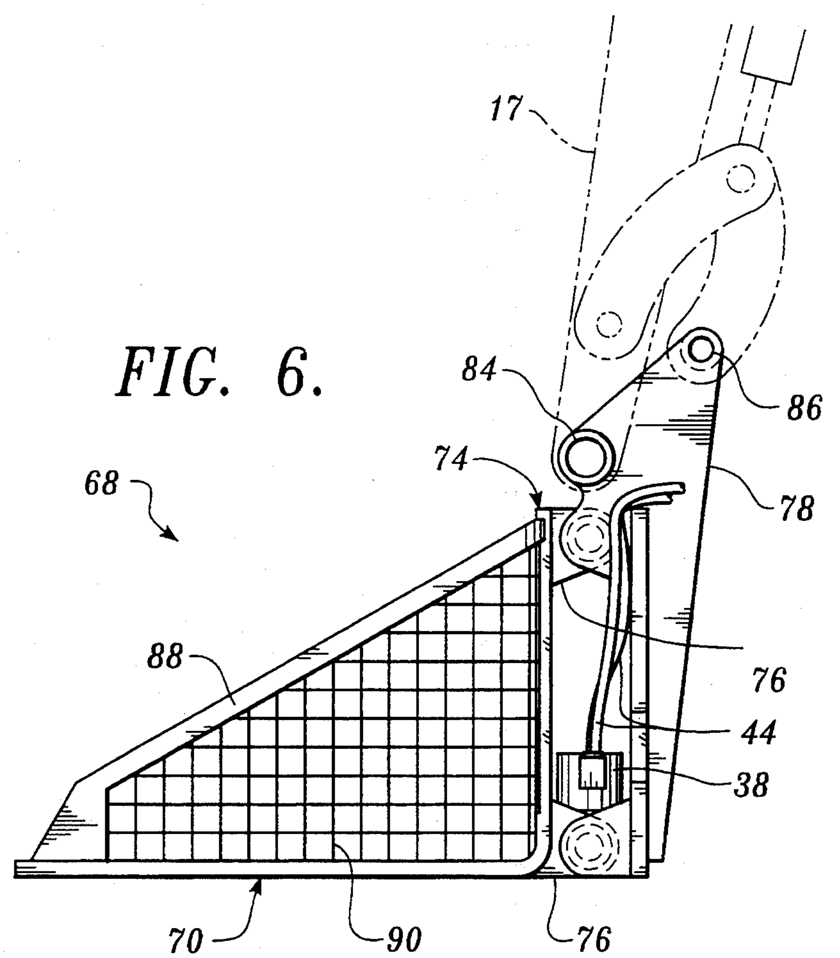
FIG. 6 is a side elevation view of the fork of FIG. 5.

An alternate preferred embodiment of a fork 68 is illustrated in FIGS. 5 and 6. Fork 68 replaces the bucket 14 of an excavator 16. The bucket 14 is removed from the distal end of the excavator boom 17 (shown in phantom in FIG. 6), and fork 68 attaches to the same locations on boom 17 to which bucket 14 is attached. Fork 68 (other than vibrational dampeners 82 as described below) preferably comprises a steel alloy of a type having good corrosion resistance to water, and ideally good corrosion resistance to sea water. For example, stainless steel or steel coated with a corrosion-resistant paint may be utilized.

Referring to FIG. 5, fork 68 includes a generally rectangular-shaped base plate 70, having a row of tines 72 formed in one end. The elongate tines 72 are oriented in parallel, spaced disposition and are sized to retain vegetation between the tines 72. Preferably, each tine 72 has a depth of about two feet, which is approximately three-quarters the overall length of the base plate 70. The row of tines 22 extends for approximately three feet, which is therefore approximately the width of the base plate 70 and of the fork 68.

Each tine 72 tapers from a wider base portion, to a rounded, narrower distal end. The base is approximately twice the width of the diameter of the rounded distal end of each tine 72, the distal end having a diameter of approximately one and one-half inches. The nominal spacing between the distal end of each tine 72 is preferably about one inch. These dimensions for the fork 12 are believed to be suitable for use in removal of spartina. However, it should be readily apparent based on the disclosure contained herein that alternate dimensions and spacing of the tines 72 may be utilized for spartina, other vegetation species, and other purposes.

As shown in FIG. 6, an edge of base plate 70 attaches to a rear portion 74 that projects perpendicularly upward from the base plate 70. Mounts 76 are provided on the side of rear portion 74 opposite from base plate 70, and project rearwardly away from rear portion 74. Pins 80 from interface member 78 extend through holes formed in mounts 76, to connect interface member 78 with rear portion 74 (see FIG. 5). Vibrational dampeners 82 concentrically surround the pins 80, insulating the pins 80 from mounts 76. Thus, interface member 78 is vibrationally isolated from the rest of the fork 68. Vibrational dampeners 82 are preferably made of an elastomeric material.

Interface member 78 includes two pivotable connections 84 and 86 at opposite corners of its upper edge. Pivotable connections 84 and 86 attach to the distal end of a conventional excavator boom 17 (shown in phantom in FIG. 6) in the same way a standard bucket 14 attaches to the boom 71. Thus, once fork 68 is attached to a boom 17, fork 68 can be maneuvered in the same way as a conventional bucket 14, i.e. extended forward and rearward, raised, lowered, tilted, etc. Fork 68 is vibrationally isolated from boom 71 by dampeners 82.

A pair of frame members 88 extends from the distal edge of base plate 70 to the upper edge of rear portion 74. The frame members 88 are positioned at opposite edges of the base plate 70 and rear portion 74 from one another. Mesh 90 extends from each frame member 88 to the corresponding edges of base plate 70 and rear portion 74. Mesh 90 is constructed from a strong, rigid material, such as interwoven and welded stainless steel rod stock. Rear portion 74 may also include a portion that is cut out (not shown), and replaced with additional mesh 90.

Vibratory motor 38, of a type previously described in connection with another preferred embodiment, mounts to rear portion 74. Vibratory motor 38 is preferably powered by a supply of hydraulic fluid from supply lines 44 leading to the system pump (not shown) of excavator 16. When fork 68 is inserted into the rooting medium 48 proximate the root mass 50 of unwanted vegetation 46, vibratory motor 38 vibrates fork 68 near the thixotropic level of the rooting medium 46, and causes liquefaction of the rooting medium 48 in the vicinity of the fork. When the rooting medium 48 is liquefied, fork 68 is raised, or otherwise drawn through the rooting medium 48 to trap the root mass 50 of the vegetation 46 in tines 72.

Further, when fork 68 is removed from the liquefied rooting medium 48, the excavator 16 can be operated to tilt the tines 72 of fork 68 upward. This tends to cause the trapped root mass 50 to fall to the rear of fork 68 against rear portion 74, more securely trapping the root mass 50. Mesh 90 aids in preventing pieces of the root mass 90 from falling off the fork 68, as the fork 68 is lifted, while simultaneously permitting silt, soil, water, and or other material to pass through mesh 90 and thus drain through the bucket formed by base plate 70 and rear portion 74. Thus, substantially only the unwanted vegetation 46 is removed.

While the preferred embodiments of the invention have been illustrated and described, it will be appreciated that various changes can be made therein without departing from the spirit and scope of the invention. For example, rather than floating the disclosed system on a barge, the excavator can ride directly on the shore.

While a one-piece fork 12 cut from a single plate has been disclosed, it should be readily apparent from the disclosure contained herein that other constructions are possible. Thus separate rods can be welded or bolted to a header block to form the fork. Likewise, the configuration and arrangement of the tines can be altered while still being effective to retain and remove vegetation. For example, the tines can be of other geometries, or oriented other than parallel, as appropriate for different plant species. Further, the tines may or may not be hollow and perforated to allow pumped high pressure water jets to augment soil removal from the root mass.

Vibratory motors have been found well suited to vibrate the forks 12 or 68. However, other sources of vibration, such as a rotating eccentric cam contacting the fork, can be utilized. Rather than isolating the fork from the excavator using dampeners 56 or 82, other types of dampeners may be employed. For example, an elastomeric sheet can be positioned between the fork and an excavator bracket.

In view of these and other alterations, substitutions and modifications that could be made by one of ordinary skill in the art, it is intended that the scope of letters patent granted hereon be limited only by the definitions of the appended claims.

The embodiments of the invention in which an exclusive property or privilege is claimed are defined as follows:

1. A method for removing unwanted vegetation, the vegetation having a root mass surrounded by a rooting medium, comprising the steps of:

(a) inserting a root engaging member into the rooting medium proximate the root mass of the vegetation;

(b) vibrating the root engaging member at a frequency predetermined to liquefy the rooting medium surrounding the root mass; and (c) removing the root engaging member to pull the vegetation and its corresponding root mass free of the rooting medium.

2. The method of claim 1, further comprising ejecting at least one jet of a fluid through the root engaging member to aid in freeing the root mass from the rooting medium.

3. The method of claim 1, further comprising providing a mesh attached to the root engaging member to aid in pulling the vegetation and its corresponding root mass free of the rooting medium.

4. The method of claim 1, wherein the step of vibrating the root engaging member comprises operating a vibratory motor mounted on the root engaging member to vibrate the root engaging member.

5. The method of claim 1, further comprising:

(a) mounting the root engaging member on a boom of an excavator; and (b) operating the excavator to move the boom and thereby insert and remove the root engaging member from the rooting medium.

6. The method of claim 5, further comprising isolating the boom of the excavator from the vibration of the root engaging member.

7. The method of claim 6, wherein the step of isolating comprises mounting the root engaging member to the boom with a vibration dampener.

8. The method of claim 5, wherein the unwanted vegetation is growing in a body of water, further comprising the steps of:

(a) placing the excavator on a buoyant platform;

(b) transporting the buoyant platform in the body of water to near the location of the unwanted vegetation; and (c) operating the excavator from the buoyant platform to remove the unwanted vegetation.

9. The method of claim 1, wherein the root engaging member inserted into the rooting medium proximate the root mass comprises a fork.

10. The method of claim 1, wherein the root engaging member is vibrated at a frequency approximately equal to the thixotropic level of the rooting medium.

11. An apparatus for removing unwanted vegetation, the vegetation having a root mass surrounded by a rooting medium, the apparatus comprising:
(a) a fork for insertion into the rooting medium proximate the root mass of the vegetation; and
(b) a vibratory motor coupled to the fork for vibrating the fork at a frequency predetermined to liquefy the rooting medium proximate the root mass, wherein the vibratory motor is capable of vibrating the fork at a frequency in the range of 0.5 cycles per second to 9.0 cycles per second.

12. The apparatus of claim 11, wherein the fork is vibrated at approximately 7.0 cycles per second.

13. An apparatus of for removing unwanted vegetation, the vegetation having a root mass surrounded by a rooting medium, the apparatus comprising:
(a) a fork for insertion into the rooting medium proximate the root mass of the vegetation;
(b) a vibratory motor coupled to the fork for vibrating the fork at a frequency predetermined to liquefy the rooting medium proximate the root mass; and
(c) an excavator, the fork being mounted to the excavator, the excavator being operable for insertion of the fork into the rooting medium, and for lifting the vegetation free of the rooting medium when the rooting medium proximate the root mass is liquefied, wherein the fork is elastomerically mounted to the excavator, to inhibit the transmission of vibrations between the fork and the excavator.

14. An apparatus of for removing unwanted vegetation, the vegetation having a root mass surrounded by a rooting medium, the apparatus comprising:
(a) a fork for insertion into the rooting medium proximate the root mass of the vegetation; and
(b) a vibratory motor coupled to the fork for vibrating the fork at a frequency predetermined to liquefy the rooting medium proximate the root mass, wherein water passages are defined in the fork for ejecting at least one jet of water into the rooting medium.

15. An apparatus of, for removing unwanted vegetation, the vegetation having a root mass surrounded by a rooting medium, the apparatus comprising:
(a) a fork for insertion into the rooting medium proximate the root mass of the vegetation; and
(b) a vibratory motor coupled to the fork for vibrating the fork at a frequency predetermined to liquefy the rooting medium proximate the root mass, wherein the fork includes a plurality of tines, and a fluid passage is defined in each tine of the fork, the fluid passages being for ejecting at least one jet of fluid into the rooting medium.

16. The apparatus of claim 15, wherein a plurality of perforations are formed in each tine of the fork for ejecting a jet of fluid into the rooting medium, each perforation being in fluid communication with the fluid passage in each tine.

17. An assembly for adapting a boom for the removal of unwanted vegetation having a root mass surrounded by a rooting medium, the boom being selectively positionable relative to the root mass, the assembly comprising:
(a) a root engaging member having an engaging portion capable of insertion into the rooting medium to engage the root mass;
(b) a vibration dampener for securing the engaging member to an end of the boom, the vibration dampener permitting the engaging member to vibrate while substantially isolating the boom from vibration of the engaging member; and
(c) a vibratory energy source coupled to the engaging member and operable to vibrate the engaging portion of the engaging member to liquefy the rooting medium around the engaging portion, so that repositioning of the boom away from the root engaging member results in removal of the root mass from the rooting medium with the engaging member.

18. The assembly of claim 17, wherein the vibratory energy source comprises a vibratory motor mounted on the engaging member.

19. The assembly of claim 17, wherein the vibration dampener comprises an elastomeric mount.

* * * * *